United States Patent
Kincaid et al.

(10) Patent No.: US 9,051,498 B2
(45) Date of Patent: *Jun. 9, 2015

(54) EPOXY RESINS WITH HIGH THERMAL STABILITY AND TOUGHNESS

(75) Inventors: Derek Scott Kincaid, Spring, TX (US); Dong Le, Richmond, TX (US); David Lanham Johnson, The Woodlands, TX (US)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/110,300

(22) PCT Filed: May 4, 2012

(86) PCT No.: PCT/US2012/036421
§ 371 (c)(1),
(2), (4) Date: Oct. 7, 2013

(87) PCT Pub. No.: WO2012/158363
PCT Pub. Date: Nov. 22, 2012

(65) Prior Publication Data
US 2014/0069583 A1    Mar. 13, 2014

Related U.S. Application Data

(60) Provisional application No. 61/485,902, filed on May 13, 2011.

(51) Int. Cl.
| | |
|---|---|
| *C08G 59/14* | (2006.01) |
| *C09J 163/00* | (2006.01) |
| *C08L 63/00* | (2006.01) |
| *C08G 59/06* | (2006.01) |
| *C08G 59/18* | (2006.01) |
| *C08G 59/22* | (2006.01) |

(52) U.S. Cl.
CPC ............... *C09J 163/00* (2013.01); *C08L 63/00* (2013.01); *C08G 59/066* (2013.01); *C08G 59/182* (2013.01); *C08G 59/226* (2013.01)

(58) Field of Classification Search
CPC ...... C08G 59/04; C08G 59/06; C08G 59/063; C08G 59/066; C08G 59/22; C08G 59/226; C08G 59/621; C08L 63/00
USPC ........................... 525/523; 528/405, 406, 421
See application file for complete search history.

(56) References Cited

U.S. PATENT DOCUMENTS

| | | | |
|---|---|---|---|
| 4,568,735 A | 2/1986 | Li | |
| 5,073,595 A | 12/1991 | Almer et al. | |
| 5,151,485 A | 9/1992 | Treybig et al. | |
| 6,833,037 B1 * | 12/2004 | Hallam et al. | 149/19.91 |
| 2003/0144416 A1 | 7/2003 | Tarbutton et al. | |
| 2007/0287801 A1 | 12/2007 | Davis et al. | |

FOREIGN PATENT DOCUMENTS

EP      0595530      5/1994

OTHER PUBLICATIONS

Stewart et al; International Journal of Adhesion and Adhesives, 2007, p. 277-287.*

* cited by examiner

*Primary Examiner* — Robert Jones, Jr.

(57) ABSTRACT

Epoxy resin compositions contain (i) a polyepoxide resin; (ii) a benzofuran diol component, a benzofuran di-epoxide component, or mixture thereof; and (iii) a curing agent, which upon curing, provides a cured resin exhibiting improved chemical and physical characteristics. The epoxy resin composition may also contain a toughening agent to further enhance the cured resin's physical characteristics.

8 Claims, No Drawings

EPOXY RESINS WITH HIGH THERMAL STABILITY AND TOUGHNESS

CROSS-REFERENCE TO RELATED APPLICATION

Not Applicable.

STATEMENT REGARDING FEDERALLY SPONSORED RESEARCH OR DEVELOPMENT

Not applicable.

FIELD OF THE INVENTION

The present invention is directed to epoxy resin compositions which, when cured, exhibit preferred chemical and physical characteristics. In particular, the cured epoxy resin compositions of the present invention demonstrate high glass transition temperature and high fracture toughness.

BACKGROUND OF THE INVENTION

It is well-known epoxy resins may be used to treat surfaces (e.g. concrete, metal, electrical components, and drywall) to protect against corrosion and other forms of wear and tear caused by everyday use and the environment. The epoxy resins generally contain a plurality of epoxy or oxirane groups which react with a curing agent to form a network or significantly cross-linked system.

Curing agents are to be distinguished from compounds referred to herein as chain extension agents. As used herein, a "chain extension agent" is meant to refer to a compound which has two (2) sites capable of reaction with epoxy groups. During polymerization, a chain extension agent will generally become lodged between epoxy resin chains, extending the same with little cross-linking occurring. In comparison, a "curing agent" refers to a compound capable of catalyzing polymerization of an epoxy resin with substantial networking or cross-linking.

In many applications, it's desired that the cured epoxy product exhibits a relatively high glass transition temperature ($T_g$). One commonly used method for obtaining a higher glass transition temperature is through the use of multifunctional epoxy resins such as those described in U.S. Pat. Nos. 4,559,395, 4,645,803, 4,550,051, 4,529,790, 4,594,291, 2,947,726, 2,971,942 and 2,809,942. However, multifunctional epoxy resins are typically not very tough or ductile and are therefore undesirable in some applications. In addition, if large concentrations of polar groups are incorporated into the resin in order to achieve a high thermal resistance, the cured product may exhibit poor moisture resistance properties.

One method for improving toughness and flexibility is through the use of chain extending agents, such as bisphenol A, which can be incorporated into the epoxy resin prior to curing. While the resulting cured product generally exhibits a relatively high degree of curing and toughness or ductility, the cured product will also tend to exhibit a relatively low glass transition temperature because of a low cross link density. The epoxy resin described in U.S. Pat. No. 4,980,234 which is based on the diglycidyl ether of 9,9-bis(4-hydroxyphenyl) fluorene, is taught to provide a material having a high glass transition temperature and flexural modulus combined with a low moisture resistance when cured.

It is an object of the present invention to provide new epoxy resin compositions from which cured epoxy products having even higher glass transition temperatures combined with excellent mechanical properties and low moisture absorption can be obtained.

SUMMARY OF THE INVENTION

The present invention relates to an epoxy resin composition comprising:
(a) a polyepoxide resin;
(b) a chain extension agent comprising at least one compound of the general formula (III) or (V):

OH-A-OH                                 (III)

$R^2$O-A-O$R^2$                           (V)

where A is a group having the formula (IV)

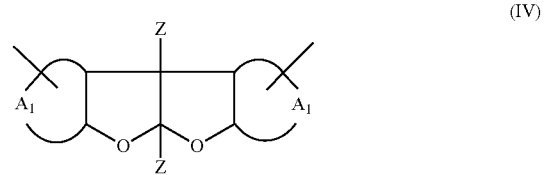

where Z is hydrogen, methyl, or phenyl; and $A_1$ represents an organic group required to complete an aromatic residue and $R^2$ is an epoxy-functionalized alkyl group having 1 to 6 carbon atoms;
(c) a toughening agent;
(d) a curing agent; and optionally
(e) a bisphenol compound.

The above components, when provided in a composition, unexpectedly yields, upon curing, a cured epoxy resin which exhibits both a high glass transition temperature and improved fracture toughness.

DETAILED DESCRIPTION OF THE INVENTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "an epoxy" means one epoxy or more than one epoxy.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The present disclosure is generally directed to novel epoxy resin compositions which include polyepoxide resins, toughening agents, benzofuran units, curing agents and optionally bisphenol compounds therein and articles or substrates coated with such compositions. It has been surprisingly found that incorporation of the toughening agents and benzofuran units produces a difunctional epoxy resin exhibiting improved glass transition temperatures, for example, a glass transition temperature of at least about 120° C., and preferably greater than about 150° C., without a substantial loss in toughness as measured by fracture toughness (i.e. $K_{1c}/G_{1c}$). In some embodiments, the compositions of the present disclosure exhibit a glass transition temperature of at least 120° C., and the fracture toughness is at least 200 Joules/m$^2$, while in other embodiments exhibit an improvement in glass transition temperature of at least 25° C. without any substantial loss in fracture toughness as compared to conventional compositions without toughening agents and benzofuran units incorporated therein. Such properties may be used to generally define a noticeably improved composition according to the present disclosure.

According to one embodiment, the benzofuran units are provided by a benzofuran diol component, a benzofuran di-epoxide component or a mixture thereof. A toughening agent is also provided to further improve the mechanical characteristics of the resulting cured material. As used herein, the term "improved glass transition temperature" is intended to refer to a cured epoxy resin whose glass transition temperature has been increased through application of the present disclosure as compared to conventional resins. The term "improved toughness" is intended to refer to a cured resin which exhibits increased fracture toughness through application of the present disclosure as compared to conventional resins.

According to one particular embodiment, a polyepoxide resin, a benzofuran diol component, a benzofuran di-epoxide component, or mixture thereof, a toughening agent and optionally a bisphenol compound are provided in an epoxy resin composition with a curing agent to form, upon curing, a cured epoxy resin exhibiting an improved glass transition temperature and toughness. As used herein, the term "polyepoxide resin" refers to a compound that contains, or contained prior to reaction, more than one epoxy group. Furthermore, the term "epoxy resin composition" is intended to refer to an uncured composition, which upon curing, cures to a "cured epoxy resin" or "cured product." In the present disclosure, the benzofuran diol component and/or benzofuran di-epoxide component are used to increase epoxy resin chain length without an introduction of increased cross-linking while the toughening agent is used to increase toughness. The curing agent, on the other hand, is used to introduce sufficient cross-linking. In some embodiments, the amount of the benzofuran diol component utilized is such that about 5%-90%, preferably about 9%-70%, of the reactive epoxy groups provided by the polyepoxide resin will react with the active hydroxy groups provided by the benzofuran diol component, while in other embodiments, the amount of the benzofuran di-epoxide component utilized is such that about 2%-78% by weight, preferably about 4%-60% by weight of the resulting resin contains benzofuran units. The amount of curing agent utilized depends on its concentration of functional groups and its molecular weight. In some embodiments, the curing agent is used in an amount sufficient for reaction with a substantial amount of remaining reactive epoxy groups in the epoxy resin composition. The term "substantial amount" is used herein to refer to an amount sufficient to generate enough cross-linking to result in a cured epoxy resin having the desired glass transition temperature and toughness.

In one embodiment, the epoxy resin composition contains from about 5% by weight to about 95% by weight, preferably from about 10% by weight to about 90% by weight, and more preferably from about 15% by weight to about 85% by weight, based on the total weight of the epoxy resin composition, of a polyepoxide resin.

The polyepoxide resin can include one or a mixture of aliphatic, cycloaliphatic or aromatic-based epoxy compounds having about 1.5 to about 2.5 epoxy groups, and preferably having about two epoxy groups. In some embodiments, the epoxy compound has an EEW of about 180 to about 20,000. In still other embodiments, the epoxy compound has a weight average molecular weight of about 400 to about 50,000.

While the epoxy compound may be used in its commercially available form, it may also be advanced to a low molecular weight epoxy compound using standard methods known to those skilled in the art, for example, by advancing an epoxy compound having an EEW of about 180 to about 500 with bisphenol A to produce an epoxy compound having an EEW of about 500 to about 12,000.

According to one embodiment, the epoxy compound is an epoxy resin represented by structural formulae (IA), (IB) or (IC):

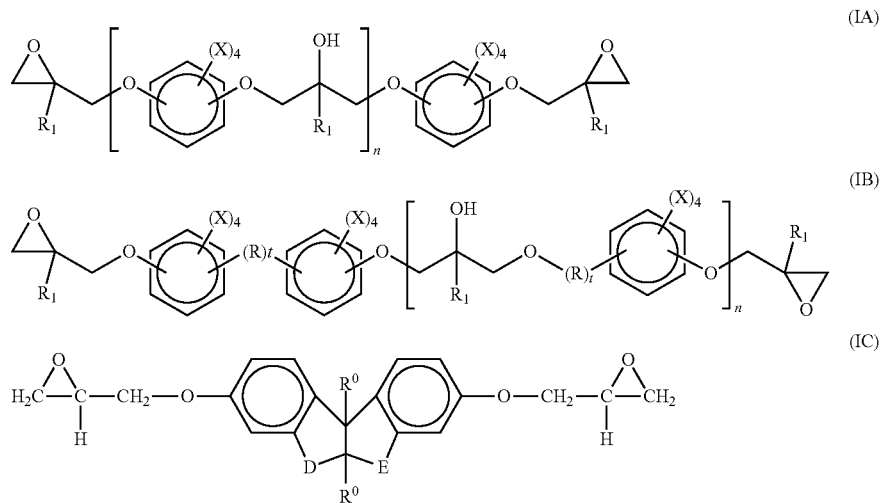

where each R is independently a divalent hydrocarbyl group having from 1 to 12, preferably from 1 to 6 carbon atoms; each $R^0$ is independently hydrogen, methyl or phenyl; each $R^1$ is independently hydrogen or an alkyl group having from 1 to 4 carbon atoms; each X is independently hydrogen or a hydrocarbyl or hydrocarbyloxy group having from 1 to 12, preferably from 1 to 6 carbon atoms, or a halogen; D and E are each independently —$(CH_2)_i$— or —$(CH_2)_i$—$R^5$— where i is an integer of 0 to 5 and $R^5$ is selected from the group of O, N, S, S—S, $Si(R)_2$, and $P(R)_2$ where R is defined as above; each t is independently 0 or 1; and n is an integer having a value of 0 to about 150. As used herein, "hydrocarbyl" refers to a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof. Similarly, the term "hydrocarbyloxy" refers to a hydrocarbyl group having an oxygen linkage between it and the object to which it is attached.

In a preferred embodiment, the epoxy compound is a diglycidyl ether of bisphenol A or bisphenol R epoxy resin, i.e. a polyether diepoxide prepared by the polymeric adduction of bisphenol A:

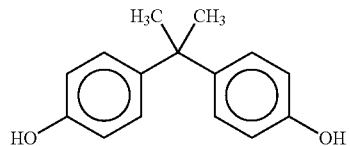

and the diglycidyl ether of bisphenol A:

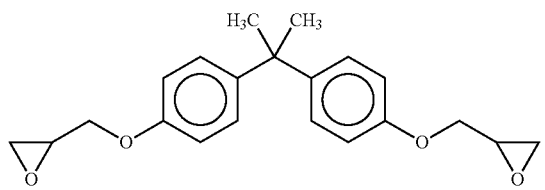

or by the reaction of diphenyl-coumarano-2',3',2,3 coumarane and epichlorohydrin:

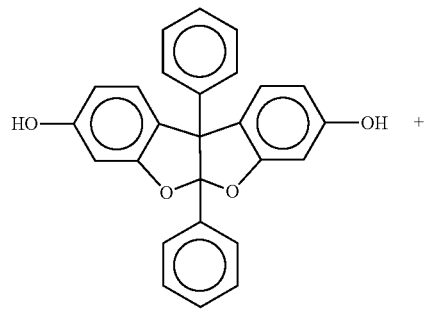

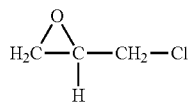

The diglycidyl ether of bisphenol A can be prepared by reacting two molecules of epichlorohydrin with one molecule of bisphenol A in the presence of a base, such as sodium hydroxide. In other embodiments, the reaction is carried out in such a manner that the resulting diglycidyl ether molecules react in situ with bisphenol molecules to produce the epoxy resin.

In this case, the epoxy resin is a mixture including polymeric species corresponding to different values of n in the following idealized formula:

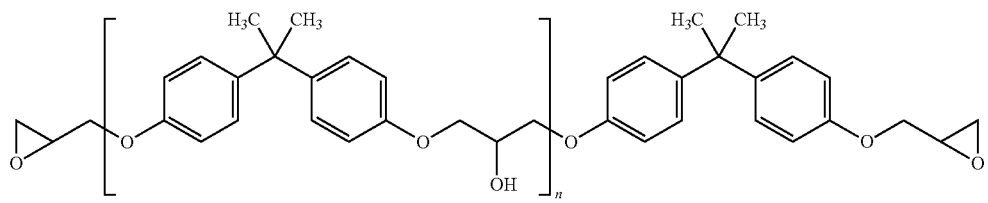

where n is a number from 0 to about 150. The diglycidyl ether of bisphenol R can be prepared by reacting epichlorohydrin with bisphenol R in the presence of a base, such as sodium hydroxide. In addition to epoxy compounds derived from bisphenol A and bisphenol R, the epoxy compound can be other epoxy resins prepared by advancing a diglycidyl ether of a bisphenol listed below with an exemplary, but non-limiting, bisphenol listed below:

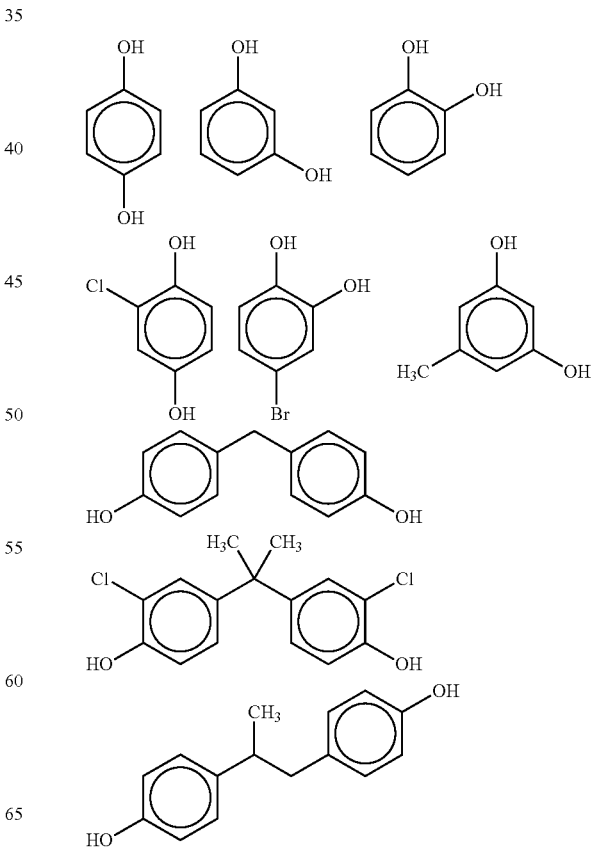

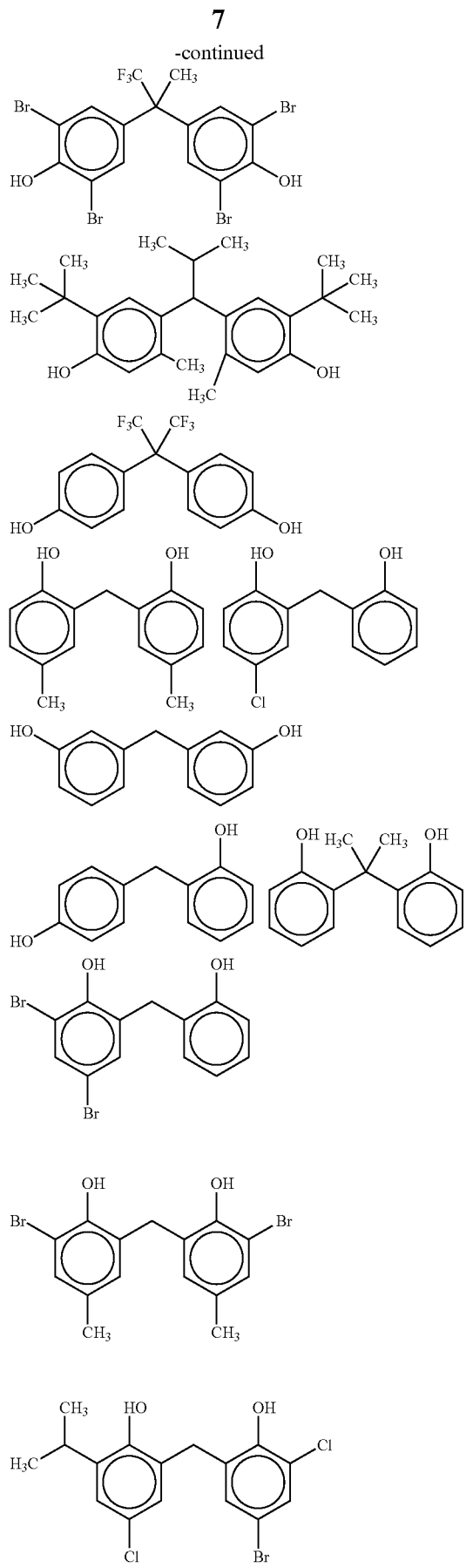

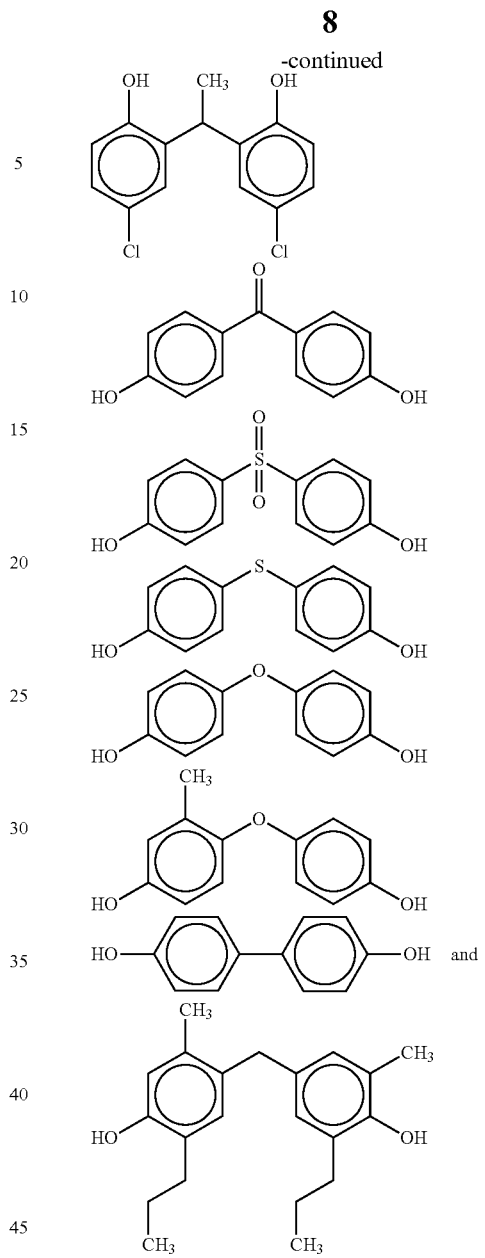

The epoxy resin composition also contains a chain extension agent. The chain extension agent of the present disclosure includes a compound of the general formula (III):

$$OH-A-OH \qquad (III)$$

where A is a group having the formula (IV)

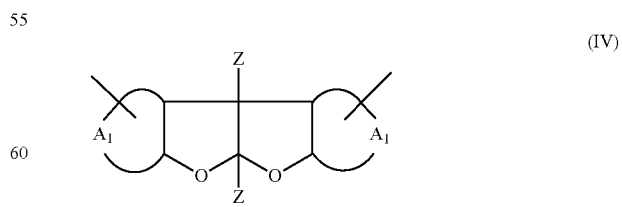

where Z is hydrogen, methyl, or phenyl; and $A_1$ represents an organic group required to complete an aromatic residue.

Aromatic residues completed by $A_1$; i.e. aromatic residues formed by $A_1$ together with the indicated attached carbon atoms in formula (IV), include phenyl, diphenylmethane (i.e. phenylmethylphenyl), biphenyl (i.e. biphenylyl), diphenylmethane substituted at the methane group (i.e. on the methane carbon atom) by one or two $C_1$-$C_4$ alkyl groups (i.e. phenyldi ($C_1$-$C_4$ alkyl)methylphenyl), diphenylketone (i.e. benzoylphenyl) or diphenylsulfone (i.e. pheynlsulphonylphenyl). In some embodiments, A is a group having the formula:

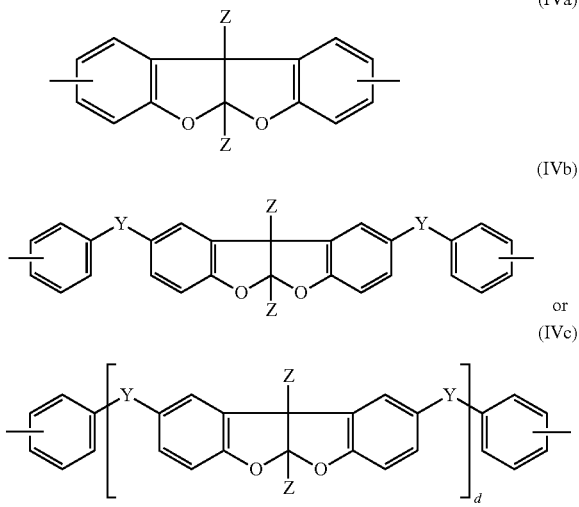

(IVa)

(IVb)

or (IVc)

where Z is defined as above; Y is a direct bond, $CH_2$, $C(C_1$-$C_4$ alkyl$)_2$, —C═O or —S(═O)$_2$; and d is an integer from 0 to 3.

The compounds of formula (III) may be produced by reacting an appropriate diol and diketone in the presence of a strong acid. The compounds of formula (III) are further described in EP0595530A1 on page 4, the content of which is incorporated herein by reference.

In still another embodiment, the chain extension agent of the present disclosure is a compound of the formula (V):

$R^2O$-A-$OR^2$ (V)

where A is defined as above and $R^2$ is an epoxy-functionalized alkyl group having 1 to 6 carbon atoms. In a preferred embodiment, each $R^2$ is a 2,3-epoxypropyl group. In this embodiment, the benzofuran units are incorporated into the polyepoxide resin through reaction of a diepoxy compound rather than through a dihydroxy compound.

In embodiments where benzofuran units are incorporated into the polyepoxide resin by use of the di-epoxide compound of formula (V), a non-benzofuran containing chain extension agent may be included to provide certain preferred characteristics in the resulting cured resin. A variety of materials may be used as the non-benzofuran containing chain extension agent including the bisphenols mentioned above. In other embodiments, the non-benzofuran containing chain extension agent can be another difunctional active hydrogen compound such as a diglycidyl ether epoxy resin, a dimercaptan, a dicarboxylic acid or a diamine.

The epoxy resin composition also contains a toughening agent. Toughening agents are well-known and are incorporated in the epoxy resin composition but are not necessarily chemically involved in the curing process. In some embodiments, the toughening agent may be chemically incorporated into the polyepoxide resin itself.

The toughening agents for use in preferred compositions of the present disclosure generally comprise: polymeric compounds having both a rubbery phase and a thermoplastic phase such as graft copolymers having a polymerized diene rubbery core and a polyacrylate or polymethacrylate shell; graft copolymers having a rubbery core with a polyacrylate or polymethacrylate shell; and elastomeric particles polymerized in situ in the epoxide from free-radical polymerizable monomers and a copolymeric stabilizer; elastomer molecules, separate elastomer precursor molecules; combination molecules that include epoxy-resin segments and elastomeric segments; and, mixtures of such separate and combination molecules. The combination molecules may be prepared by reacting epoxy materials with elastomeric segments; the reaction leaving reactive functional groups, such as unreacted epoxy groups, on the reaction product.

Specific examples of toughening agents include graft copolymers having a polymerized diene rubbery backbone or core to which is grafted a shell of an acrylic acid ester or methacrylic acid ester, monovinyl aromatic hydrocarbon, or a mixture thereof, such as disclosed in U.S. Pat. No. 3,496,250, incorporated herein by reference. Preferable rubbery backbones can comprise polymerized butadiene or a polymerized mixture of butadiene and styrene. Preferable shells comprising polymerized methacrylic acid esters can be lower alkyl ($C_{1-4}$) substituted methacrylates. Preferable monovinyl aromatic hydrocarbons can be styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature below about 0° C., such as polybutyl acrylate or polyisooctyl acrylate to which is grafted a polymethacrylate polymer (shell) having a glass transition temperature of about 25° C. such as polymethylmethacrylate.

Still further examples of toughening agents useful in the invention are elastomeric particles that have a glass transition temperature below about 25° C. and have been polymerized in situ in the epoxide before mixing with the other components of the composition. These elastomeric particles are polymerized from free-radical polymerizable monomers and a copolymerizable polymeric stabilizer that is soluble in the epoxide. The free-radical polymerizable monomers are ethylenically unsaturated monomers or diisocyanates combined with coreactive difunctional hydrogen compounds such as diols, diamines, and alkanolamines. Examples of these elastomeric particles are disclosed in U.S. Pat. No. 4,525,181, which is incorporated herein by reference. These particles are commonly referred to as "organosols".

Still other toughening agents are rubber modified liquid epoxy resins. An example of such a resin is Kraton® RP6565 rubber. The modified epoxy resin is made from 85% by weight Epon®828 epoxy and 15% by weight of a Kraton® rubber. The Kraton® rubbers are known in the industry as elastomeric block copolymers.

The amount of toughening agent to be used depends in part upon the final physical characteristics of the cured resin desired, and is generally determined empirically. In one embodiment, the toughening agent is preferably used in an amount up to about 35 parts by weight per 100 parts of epoxy resin. Above 35 parts of toughening agent, the composition can become very viscous and may require a preheating or prewarming to facilitate its dispensing. The toughening agents of the present disclosure add toughness to the composition after curing. Some toughening agents can react and others will not react with the polyepoxide resin.

Other useful toughening agents include: carboxylated and amine terminated acrylonitrile/butadiene vulcanizable elastomer precursors such as Hycar® CTBN 1300×8 and ATBN 1300×16 and Hycar® 1072; butadiene polymer such as Hycar® CTB; amine functional polyethers such as HC1101 (i.e., polytetramethylene oxide diamine) a 10,000 MW, primary amine-terminated, compound; and Jeffamine® from Huntsman Corporation; functional acrylic rubbers including acrylic core/shell material, such as Acryloid® KM330 and 334; and core/shell polymers, such as methacrylate-butadiene-styrene (MBS) copolymer wherein the core is crosslinked styrene/butadiene rubber and the shell is polymethylacrylate (e.g., Acryloid® KM653 and KM680). As used above, for acrylic core/shell materials "core" will be understood to be an acrylic polymer having a Tg<0° C. and "shell" will be understood to be an acrylic polymer having a Tg>25° C. A typical, preferred, list of toughening agents includes: acrylic core/shell polymers; styrene-butadiene/methacrylate core/shell polymers; polyether polymers; carboxylated acrylonitrile/butadienes; and, carboxylated butadienes. A particular advantage is achieved from the presence of the toughening agent or combinations of different toughening agents, as previously suggested. It is a feature of the present disclosure that improved resins as disclosed herein are generally made particularly susceptible to, or are enhanced with respect to, the beneficial effects of tougheners.

The epoxy resin composition also contains a curing agent for curing the epoxy resin composition and forming a crosslinked polymer network. According to one embodiment, the curing agent is an aliphatic, cycloaliphatic, aromatic or heterocyclic amine, including but not limited to, m- and p-phenylenediamine, bis(4-aminophenyl)methane, aniline-formaldehyde resin, bis(4-aminophenyl)sulphone, ethylenediamine, propane-1,2-diamine, propane-1,3-diamine, N,N-diethylethylenediamine, hexamethylenediamine, diethylenetriamine, triethylenetetramine, tetraethylenepentamine, N-(2-hydroxyethyl)-,N-(2-hydroxypropyl)- and N-(2-cyanoethyl)-diethylenetriamine, 2,2,4-trimethylhexane-1,6-diamine, 2,3,3-trimethylhexane-1,6diamine, m-xylylenediamine, N,N-dimethyl- and N,N-diethylpropane-1,3-diamine, ethanolamine, bis(4-aminocyclohexyl)methane, 2,2-bis(4-aminocyclohexyl)propane, 2,2-bis(4-amino-3-methylcyclohexyl)propane, 3-aminoemethyl-3,5,5-trimethylcyclohexylamine(isophoronediamine), and N-(2-aminoethyl)piperizine, 2,4,6-tris(dimethylaminomethyl)phenol and other Mannich bases, N-benzyldimethylamine, triethanolamine, a dicyandiamide, a carboxylic acid hydrazide, an imidazole, an aminoplast, a polyaminoamide (for example, those prepared from aliphatic polyamines and dimerized or trimerized unsaturated fatty acids), an isocyanate, an isothiocyanate; phosphoric acid; a polythiol; or a polycarboxylic acid and its anhydride, for example, phthalic anhydride, tetrahydrophthalic anhydride, methylendomethylenetetrahydrophthalic anhydride, nonenylsuccinic anhydride, dodecenylsuccinic anhydride, hexahydrophthalic anhydride, hexachloroendomethylenetetrahydrophthalic anhydride and endomethylenetetrahydrophthalic anhydride and their mixtures, maleic anhydride, succinic anhydride, pyromellitic acid dianhydride, benzophenone-3,3',4,4'-tetracarboxylic anhydride, polysebacic anhydride, polyazelaic anhydride, the acids corresponding to the aforementioned anhydrides and also isophthalic acid, terephthalic acid, citric acid and mellitic acid. Other curing agents include alkali metal alkoxides of alcohols, for example, the sodium alcoholate of 2,4-dihydroxy-3-hydroxymethylpentane, stannous salts of alkanoic acids, for example, stannous octanoate, Friedel-Crafts catalysts, for example, boron trifluoride and its complexes, and chelates formed by the reaction of boron trifluoride with 1,3-diketones.

The amount of curing agent which may be utilized will vary from resin composition to resin composition and will generally be provided in such an amount as to be effective in causing substantial curing within a desired length of time. In one embodiment, the amount of curing agent used may range between about 1-40% by weight, based on the total weight of the epoxy resin composition. In other embodiments, when the curing agent is an amine, the amount of curing agent used may range from about 0.75 to about 1.25 amino-hydrogen equivalents of the amine per 1,2-epoxy equivalent remaining in the epoxy resin composition. When polycarboxylic acids or their anhydrides are used, usually from about 0.4 to about 1.1 carboxylic acid or carboxylic acid anhydride equivalents are provided per 1,2-epoxy equivalent remaining in the epoxy resin composition.

The epoxy resin may also contain, if desired an additional bisphenol compound. Examples of bisphenol compounds which may be further included are those bisphenols listed above, especially bisphenol A.

If desired, the epoxy resin composition may optionally be mixed before cure with one or more customary additives, such as, stabilizers, extenders, fillers, reinforcing agents, pigments, dyestuffs, plasticizers, tackifiers, accelerators, non-reactive diluents or any mixture thereof.

Stabilizers which may be employed include: phenothiazine itself or C-substituted phenothiazines having 1 to 3 substituents or N-substituted phenothiazines having one substituent for example, 3-methyl-phenothiazine, 3-ethyl-phenothiazine, 10-methyl-phenothiazine; 3-phenyl-phenothiazine, 3,7-diphenyl-phenothiazine; 3-chlorophenothiazine, 2-chlorophenothiazine, 3-bromophenothiazine; 3-nitrophenothiazine, 3-aminophenothiazine, 3,7-diaminophenothiazine; 3-sulfonyl-phenothiazine, 3,7-disulfonyl-phenothiazine, 3,7-dithiocyanatophenthiazin; substituted quinines and catechols, copper naphthenate, zinc-dimethyldithiocarbonate and phosphotungistic acid hydrate. Extenders, reinforcing agents, fillers, accelerators and pigments which can be employed include, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aerosil"), lithopone, barite, titanium dioxide, eugenol, dicumyl peroxide, isoeugenol, carbon black, graphite, and iron powder. It is also possible to add other additives, for example, flameproofing agents, flow control agents such as silicones, cellulose acetate butyrate, polyvinyl butyrate, waxes, stearates and the like.

In one preferred embodiment, the epoxy resin composition includes a polyepoxide resin, which in the presence of the benzofuran diol and/or benzofuran di-epoxide component and toughening agent is represented by the formula (VI)

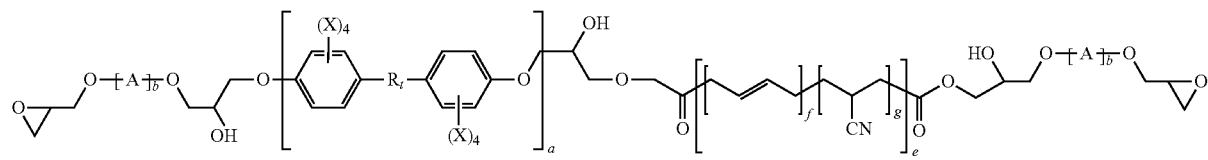

(VI)

where X, R, A and t are defined as above, a is an integer from 1-100, preferably from 1-30, b is an integer from 1-100, preferably from 1-30, e is an integer from 1-100, preferably from 1-30, and f and g are independently an integer from 1 to 1000.

In one embodiment, the polyepoxide resin, benzofuran diol component and/or benzofuran di-epoxide component and toughening agent are combined with a suitable curing agent and are useful as composite matrix resins. Prepregs can be prepared by dipping a tow of continuous reinforcing fibers into a solution of the resin (in monomeric or polymeric form) and then winding this onto a drum to form a unidirectional prepreg sheet of length equal to the circumference of the drum. Other prepregging methods well known to those skilled in the art, such as hot melt methods, could also be used. The solvent is then evaporated from the prepreg on the drum or in an oven. The partially or completely dried prepreg sheet is then cut into smaller pieces which are stacked into the desired configuration and then consolidated into a laminate by the application of heat and pressure. The laminating process also serves to cure the resin. Typically the laminate is consolidated (fused and made void free) at a temperature below which cure is rapid. Once consolidated the temperature is raised to effect cure. After lamination the part is often post-cured free-standing at a still higher temperature in an oven.

The novel epoxy resin compositions of the present disclosure are also useful as high temperature adhesives. Typically, the resin composition can be applied to either or both adhered surfaces as a glass-cloth prepreg, a resin solution (in monomeric or polymeric form), or a resin film. The assembly is then consolidated and cured under heat and pressure in a manner similar to that used to form composites described above.

In addition, numerous uses exist for the epoxy resin compositions of the present disclosure, such as in electronics applications. For example, they can be applied from solutions to form planarizing or dielectric layer(s) on silicon wafers, or they can be used to encapsulate electronic devices. The applied layer(s) or encapsulants can then be dried and cured to form a thermo-oxidatively stable thermoset film.

In another embodiment, in order to achieve more rapid and/or more complete curing, the combined mixture obtainable from the polyepoxide resin, benzofuran diol component and/or benzofuran di-epoxide component and toughening agent according to the present disclosure in combination with the curing agents mentioned may also be heated at 50° C. to 300° C. for a period of time for an appropriate length of time. Heating cycles may be used, such as, 50° C. for about 0.25-1 hour, 150° C. to 200° C. for about 0.5-2 hours, and 175° C. to 250° C. for about 1-5 hours.

In some embodiments, it may be preferred to react all of the chain extension agent with the polyepoxide resin before curing is initiated. This will, in part, depend on the percent of chain extension agent to be incorporated.

Thus, as noted above, the epoxy resin compositions of the present disclosure are suitable for use in a variety of applications, for example, in the field of composites such as in the fabrication of castings or of prepregs, in the field of electronics such as potting and molding compositions, in laminating processes, as adhesives and in surface protection such as a coating for a pipe or container.

In another embodiment, the present disclosure provides a method of bonding at least two substrates together which includes:

a) providing an epoxy resin composition comprising: (i) a polyepoxide resin; (ii) a benzofuran diol component; a benzofuran diepoxide component or a mixture thereof as described above; (iii) a toughening agent; and (iv) a curing agent;

b) applying the epoxy resin composition to at least one surface of one or more of the substrates; and c) matingly engaging the surfaces of the substrates which are to be bonded together permitting the composition to cure to form a bond there between.

The substrates to be adhered may be clamped for firmness during cure in those installations where relative movement of the substrates might be expected. For example, to adhere two substrate surfaces, an adherent quantity of the epoxy resin composition is applied to at least one surface, preferably to both surfaces, and the surfaces are contacted with the composition there between. The smoothness of the surfaces and their clearance will determine the required film thickness for optimum bonding. The epoxy resin composition may be applied to one or more surfaces of the substrates, prior to, subsequently to, or simultaneously with the curing agent, at a desired thickness by methods well known to those skilled in the art, such as, spraying, dipping, brushing, painting, roller coating, etc. After application, the composition is cured at ambient conditions and/or by the application of heat. The surfaces and the interposed epoxy resin composition are maintained in engagement until the composition has cured sufficiently to bond the surfaces. Examples of substrates which the composition may be applied to include, but are not limited to, steel, galvanized steel, aluminum, copper, brass, wood, glass, paper, composites, ceramics, plastics and polymeric materials such as polyester, polyamide, polyurethane, polyvinyl chloride, polycarbonates, ABS plastics, and plexiglass.

EXAMPLES

Examples 1-2

Two epoxy resin compositions were prepared according to the following formulations and cured with diethylenetoluene diamine (DETDA):

| | Wt/epoxide | Ex. 1 | Ex. 2 |
|---|---|---|---|
| DGEBF[1] | 166 | 72 g | 37 g |
| Benzofuan advanced DGEBPA/CTBN X8/BPA[2] | 500 | 28 g | 63 g |
| Equivalent Ratio | | 0.13 | 0.7 |
| % CTBN | | 10.06 | 10.08 |
| Benzofuran based bisphenol, % | | 17.4 | 49.8 |
| Resin blend viscosity at 90° C. | | 188 cps | 1416 cps |
| Equiv BPA/CTBN | | 1:1 | 5:1 |

[1]Diglycidyl ether of bisphenol F
[2]Benzofuran advanced diglycidyl ether of bisphenol A/carboxyl terminated butadiene-acrylonitrile based toughening agent/bisphenol A.

The two compositions were then cured at 150° C. for two hours, then 180° C. for two hours and the cured product exhibited the following properties:

| | Ex. 1 | Ex. 2 |
|---|---|---|
| Tg, DMA Storage modulus | 161° C. | 183° C. |
| $K_{1c}$, MPa√m | 0.90 | 0.77 |
| $G_{1c}$, J/m$^2$ | 355 | 264 |

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An epoxy resin composition comprising:
   (a) a polyepoxide resin obtained from the reaction of an epoxy compound presented by structural formulae (IA) or (IB):

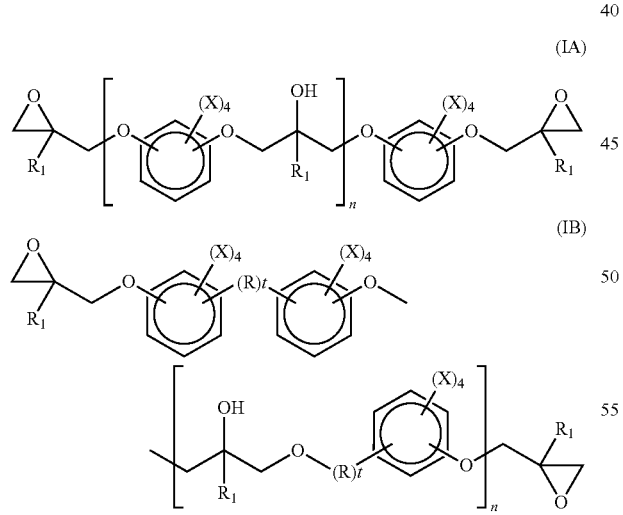

where each R is independently a divalent hydrocarbyl group having from 1 to 12 carbon atoms; each $R^1$ is independently hydrogen or an alkyl group having from 1 to 4 carbon atoms; each X is independently hydrogen, a hydrocarbyl or hydrocarbyloxy group having from 1 to 12 carbon atoms, or a halogen; each t is independently 0 or 1; and n is an integer having a value of 0 to about 150 and a chain extension agent of the general formula (V):

$$R^2O\text{-}A\text{-}OR^2 \quad (V)$$

where A is a group having the formula (IV)

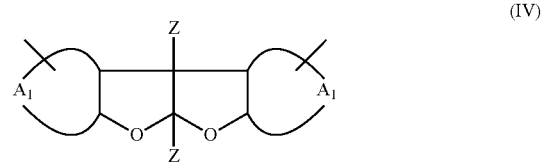

where Z is hydrogen, methyl, or phenyl; and $A_1$ represents an organic group required to complete an aromatic residue and $R^2$ is an epoxy-functionalized alkyl group having 1 to 6 carbon atoms and optionally a non-benzofuran containing chain extension agent;
   (b) a toughening agent;
   (c) a curing agent; and optionally
   (d) a bisphenol compound.

2. The epoxy resin composition of claim 1, wherein $A^1$ is phenyl, diphenylmethane, biphenyl, diphenylmethane substituted at the methane group by one or two $C_1$-$C_4$ alkyl groups, diphenylketone or diphenylsulfone.

3. The epoxy resin composition of claim 1, wherein A is a group having the formula:

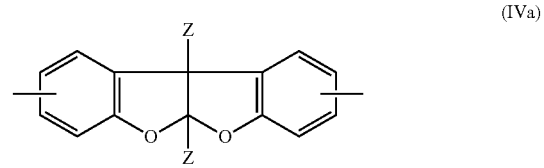

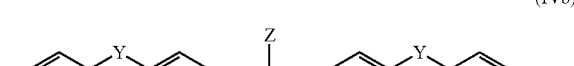

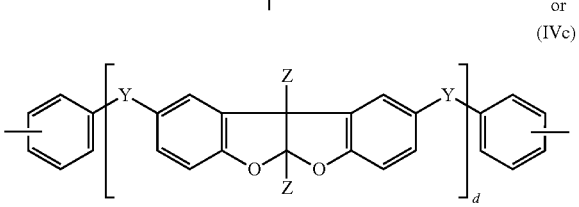

wherein Z is defined as in claim 1 and Y is a direct bond, $CH_2$, $C(C_1\text{-}C_4 \text{ alkyl})_2$, —C=O or —S(=O)$_2$; and d is an integer from 0 to 3.

4. The epoxy resin composition of claim 1, wherein the toughening agent is a carboxylated or amine terminated acrylonitrile/butadiene elastomer.

5. The epoxy resin composition of claim 1, further comprising a bisphenol compound selected from bisphenol A, bisphenol F, bisphenol R, bisphenol S and a mixture thereof.

6. An epoxy resin composition comprising a reaction product of a polyepoxide resin, benzofuran di-epoxide component and a toughening agent and which is represented by the formula (VI)

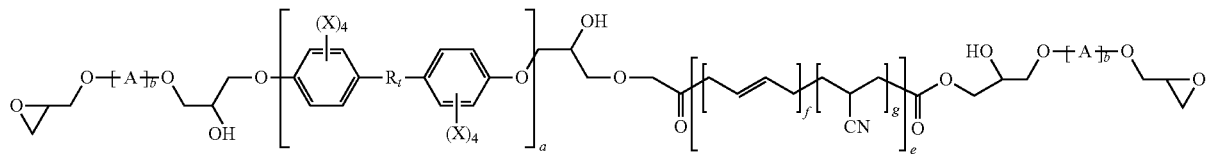
(VI)

where R is a divalent hydrocarbyl group having from 1 to 12 carbon atoms; X is independently hydrogen or a hydrocarbyl or hydrocarbyloxy group having from 1 to 12 carbon atoms, or a halogen; t is 0 or 1; A is a group having the formula (IV)

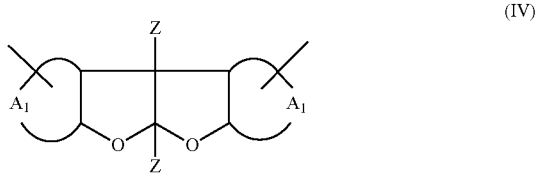
(IV)

where Z is hydrogen, methyl, or phenyl and $A_1$ represents an organic group required to complete an aromatic residue; a is an integer from 1-100; and, b is an integer from 1-100; e is an integer from 1-100; and f and g are integers from 1-1000.

7. A method of bonding at least two substrates together comprising:
a) providing an epoxy resin composition according to claim 1
b) applying the epoxy resin composition to at least one surface of one or more of the substrates; and
c) matingly engaging the surfaces of the substrates which are to be bonded together permitting the composition to cure to form a bond there between.

8. An uncured epoxy resin composition comprising:
(a) a polyepoxide resin obtained by the reaction of
(i) an epoxy compound represented by structural formulae (IA), (IB), or (IC):

where each R is independently a divalent hydrocarbyl group having from 1 to 12 carbon atoms; each $R^1$ is independently hydrogen or an alkyl group having from 1 to 4 carbon atoms; each X is independently hydrogen, a hydrocarbyl or hydrocarbyloxy group having from 1 to 12 carbon atoms, or a halogen; each t is independently 0 or 1; and n is an integer having a value of 0 to about 150; each $R^0$ is independently hydrogen, methyl or phenyl; D and E are each independently $—(CH_2)_i—$ or $—(CH_2)_i—R^5-$ where i is an integer of 0 to 5 and $R^5$ is selected from the group of O, N, S, S—S, Si(R)$_2$, and P(R)$_2$, where R is independently a divalent hydrocarbyl group having from 1 to 12 carbon atoms, (ii) a chain extension agent of the general formula (III):

OH-A-OH  (III)

where A is a group having the formula (IV)

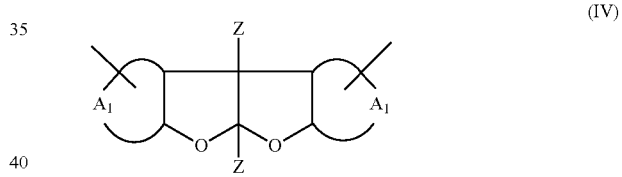
(IV)

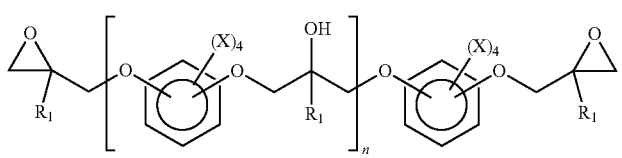
(IA)

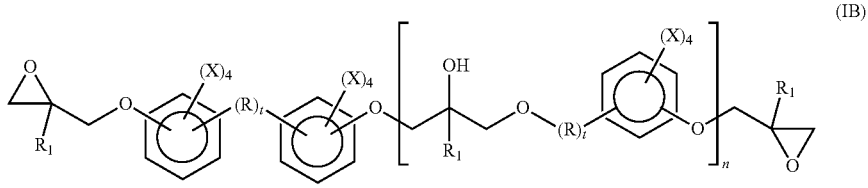
(IB)

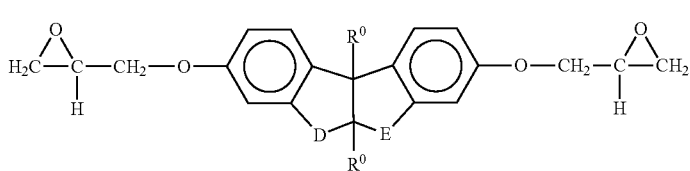
(IC)

where Z is hydrogen, methyl, or phenyl; and $A_1$ represents an organic group required to complete an aromatic residue and
    (iii) a toughening agent;
       (b) a curing agent; and optionally
       (c) a bisphenol compound.

* * * * *